United States Patent [19]

Abe et al.

[11] Patent Number: 4,869,532
[45] Date of Patent: Sep. 26, 1989

[54] PRINTS AND PRODUCTION METHOD THEREOF

[75] Inventors: Yoshio Abe, Iwatsuki; Shojiro Horiguchi, Omiya; Shozo Ohira, Hoya; Michiei Nakamura, Soka; Masaru Hasegawa, Tokyo; Kimihide Kawamura, Koshigaya; Kazuo Kanou, Satte; Katsuhiko Kitabayashi, Miyashiro; Yoshiyuki Zama, Narashino; Shiro Yamamiya, Tokyo, all of Japan

[73] Assignee: Dainichiseika Color & Chemicals Mfg. Co., Ltd., Tokyo, Japan

[21] Appl. No.: 102,403

[22] Filed: Sep. 29, 1987

[30] Foreign Application Priority Data

Oct. 7, 1986 [JP] Japan ............................ 61-237126
Oct. 7, 1986 [JP] Japan ............................ 61-237127

[51] Int. Cl.⁴ .................. B42D 15/00; B05C 11/00; G01J 5/02
[52] U.S. Cl. .............................. 283/88; 106/20; 350/341
[58] Field of Search ............. 283/88; 250/339, 340, 250/341, 458.1, 338; 106/1.5, 2, 20; 101/171; 430/616, 944

[56] References Cited

U.S. PATENT DOCUMENTS

| | | | |
|---|---|---|---|
| 4,530,961 | 7/1985 | Nguyen et al. | 106/20 |
| 4,540,595 | 9/1985 | Acitelli | 106/20 |
| 4,583,766 | 4/1986 | Wessel | 283/88 |
| 4,627,819 | 12/1986 | Burrows | 283/88 |
| 4,680,368 | 7/1987 | Nakamoto et al. | 106/20 |
| 4,711,668 | 12/1987 | Shimada | 106/20 |
| 4,732,616 | 3/1988 | Kondo et al. | 106/20 |
| 4,733,079 | 3/1988 | Adams et al. | 250/341 |

FOREIGN PATENT DOCUMENTS

| 2013394 | 1/1987 | Japan | 283/88 |
|---|---|---|---|
| 1534403 | 12/1977 | United Kingdom | 283/88 |

*Primary Examiner*—Douglas D. Watts
*Assistant Examiner*—Paul M. Heyrana
*Attorney, Agent, or Firm*—Oblon, Spivak, McClelland, Maier & Neustadt

[57] ABSTRACT

A print is produced by printing or coating an infrared reflective coloring agent and another printing ink containing an infrared absorptive coloring agent in combination on a base material. The print therefore contains visually-recognizable information along with other information which is recognizable by infrared rays.

6 Claims, 2 Drawing Sheets

PRINTS AND PRODUCTION METHOD THEREOF

BACKGROUND OF THE INVENTION (1) Field of the Invention:

This invention relates to a printed or coated material or article (hereinafter called "print" for the sake of brevity) making use of an infrared reflective coloring agent and its production method, and more specifically to a print obtained by printing or coating a base material with a printing ink or coating formulation (hereinafter called "printing ink" for the sake of brevity) containing an infrared reflective coloring agent and another printing ink containing an infrared absorptive coloring agent and a method for the production of the print.

(2) Description of the Prior Art:

As a one way to cope with electrophotographic forgery of negotiable securities such as share certificates and public and corporate bonds, airline tickets, checks and the like, it has conventionally been practised to print in advance anti-forgery words and/or pattern in a hidden form on such prints. As a method for facilitating discovery of forged items, it has been proposed, for example, to print beforehand a magnetic mark in the form of letters, symbol, pattern or the like with a magnetic ink and to determine their genuineness or spuriousness by means of a magnetic reader.

The above-mentioned hidden letters or patterns in negotiable securities are themselves effective means for the prevention or discovery of forgery. It is not easy to use such hidden letters or patterns in simple prints because they require a printing technique of high level. In addition, such hidden letters or patterns may not be used widely since a limitation is imposed by their use on permissible designs and patterns.

The method which makes use of magnetic marks is insufficient in reliability, since the intensity of the magnetism is changed or the magnetism is lost entirely when the magnetic marks are exposed to heat or are placed in an environment of high magnetic field or the like.

SUMMARY OF THE INVENTION

An object of this invention is to provide a method for the discovery or prevention of forgery or unauthorized alteration of negotiable securities.

Another object of this invention is to provide a method for hiding secret information.

A further object of this invention is to provide useful teaching aids, picture books and the like.

The present inventors have carried out a variety of investigation with a view toward solving the above-described drawbacks of the conventional techniques. As a result, it has been found that the combined use of the infrared-ray reflectivity of a coloring agent and the absorbance of another coloring agent is effective for the solution of the above-described drawbacks of the conventional techniques, leading to completion of this invention.

In one aspect of this invention, there is thus provided a print comprising a base material and a printing ink containing an infrared reflective coloring agent and another printing ink containing an infrared absorptive coloring agent applied in combination on the base material, whereby visually-recognizable information is provided along with other information, which is recognizable by infrared rays, on the base material.

In another aspect of this invention, there is also provided a method for the production of a print, which comprises applying an infrared reflective coloring agent and another printing ink containing an infrared absorptive coloring agent in combination on a base material, whereby visually-recognizable information is provided along with other information, which is recognizable by infrared rays, on the base material.

According to the present invention, a print is produced by using in combination a printing ink containing an infrared reflective coloring agent and another printing ink containing an infrared absorptive coloring agent. The print can provide information different from that recognized visually as colors under visible light by detecting information of infrared rays, which have been reflected back from the print, by means of an infrared reader.

The present invention is therefore useful as a means for preventing forgery and/or unauthorized alteration of negotiable securities such as share certificates and public and corporate bonds and important or secret documents such as airline tickets, checks, bankbooks, credit cards, bank cards, lottery cards and pari-mutuel tickets. It is also useful as a means for discovering forged items, altered items and the like.

This invention is also useful as a means for hiding secret information. Prints according to this invention are useful as teaching aids, picture books, and the like for students, infants, etc. They are also useful as toys and brain-training games. Furthermore, prints according to this invention are also useful as signs or signals which make use of the absorption and reflection of infrared rays.

The above and other objects, features and advantages of the present invention will become apparent from the following description and the appended claims.

DETAILED DESCRIPTION OF THE INVENTION AND PREFERRED EMBODIMENTS

Figure 1:
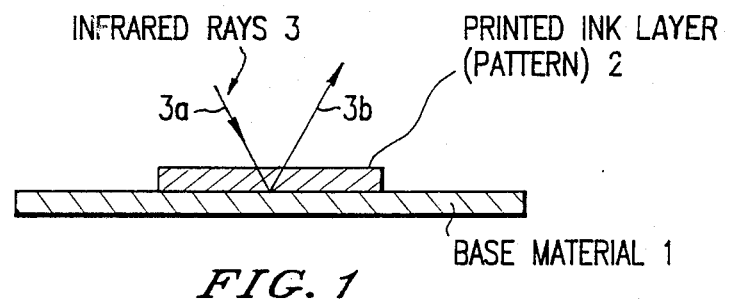
Figure 2A:
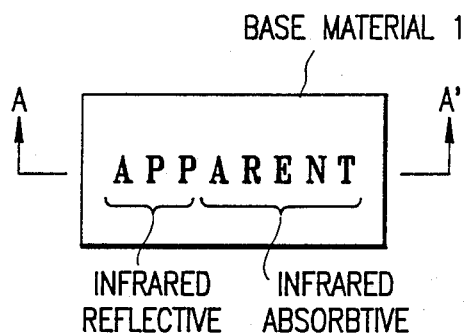
Figure 2B:
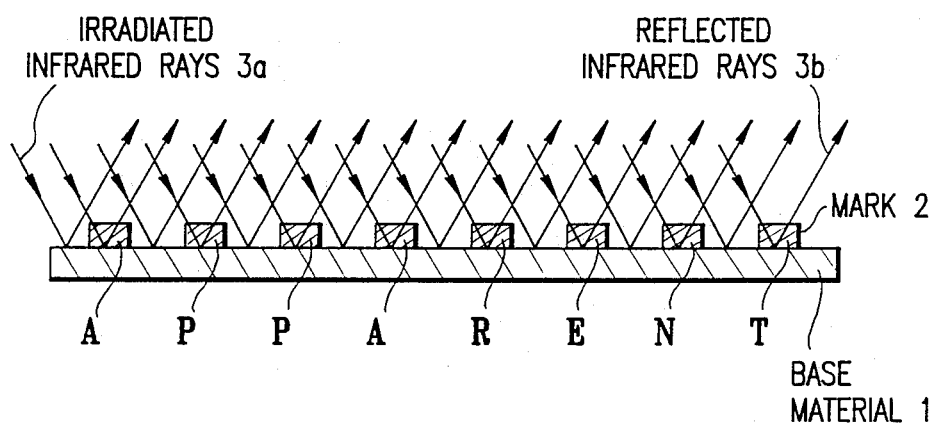
Figure 3A:
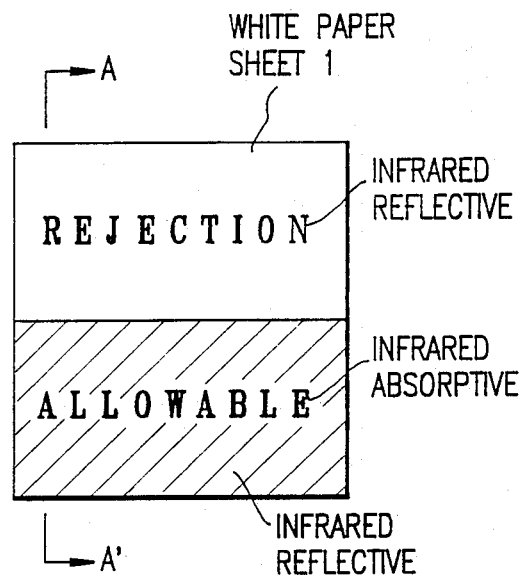
Figure 3B:
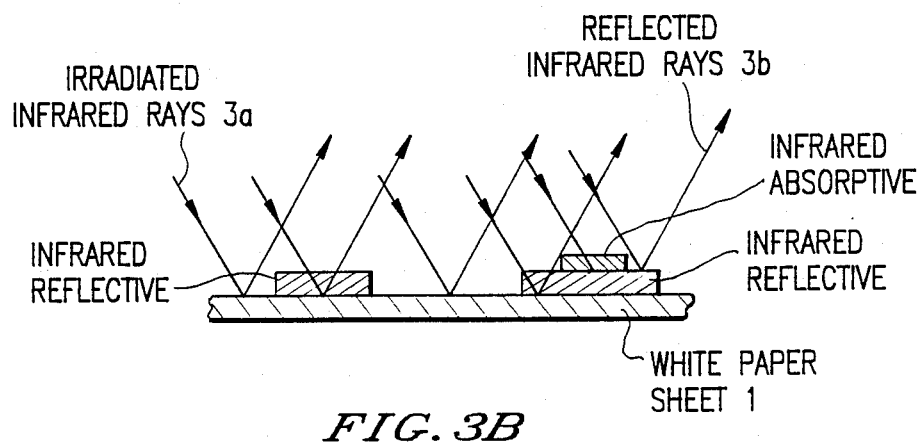

The present invention will hereinafter be described in further detail. Carbon black pigments are used as pigments in conventional black inks, which have been used in general printing, including the printing of the above-mentioned negotiable securities.

When a print printed with a black ink is exposed to infrared rays, the black print absorbs the infrared rays and does not reflect same because its carbon black pigment has such properties that it absorbs infrared rays but does not reflect same.

It is therefore possible to obtain a signal indicative of the absence of reflection of infrared rays by emitting infrared rays from a light-emitting diode against a print, detecting the reflection of infrared rays from the print by an infrared detector and determining the presence or absence of the reflection of infrared rays by an infrared reader.

On the other hand, certain black coloring agents have been found to show substantially no or low absorption of infrared rays and to exhibit very high reflection of infrared rays although they also have black colors.

A print which makes use of the above-mentioned infrared reflective black coloring agent therefore gives signals indicative of strong reflection of infrared rays when the print is inspected by the above-mentioned infrared reader.

The present inventors have hence found that effective use of properties of an ink making use of a carbon black pigment having infrared ray absorbance and those of another ink making use of a coloring agent having infrared ray reflectivity permits distinction of letters and/or patterns by an infrared reader although they look exactly the same and cannot be distinguished from each other under visible light (visually); letters and/or patterns cannot be distinguished under infrared rays even if they are distinguishable in various aspects such as hue, value and chroma under visible light; in differences in hue, value and chroma, signals corresponding to colors recognized under visible light can be reversed from those corresponding to colors sensed under infrared rays; the use of these features is effective as a means for the discovery of forged or altered items out of the above-described negotiable securities and the like and as a means for hiding secret information for third parties; and useful teaching aids, picture books, toys, play and amusement equipment, etc. can be provided by using differences between the sensitivity under visible light and that under infrared rays.

Coloring agents useful in the practice of this invention will next be described.

As illustrative examples of the coloring agent having infrared reflective properties, may be mentioned conventionally-known chromatic and black coloring agents of the azo, anthraquinone, phthalocyanine, perinone* perylene, indigo thioindigo, dioxazine, quinacridone, isoindolinone, chromatic iron oxide and chromatic spinel-structured types.

These coloring agents may be used singly. As an alternative, two or more of these coloring agents may be used as a mixed coloring agent. Regarding a black color in particular, besides a black coloring agent, it is also possible to mix a blue purple-purple coloring agent and a yellow-yellow green coloring agent, a blue-aquamarine coloring agent and a yellow orange-orange coloring agent, a bluish green-green coloring agent and a red-reddish purple coloring agent, or to formulate two or more coloring agents such as a blue coloring agent, red coloring agent and yellow coloring agent or a green coloring agent, orange-brown coloring agent and purple coloring agent.

As coloring agents particularly preferable among the above-described coloring agents, may be mentioned azo pigments having an azomethine-type chromophore represented by the following general formula (I):

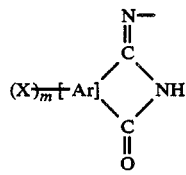

wherein Ar means a residuum of an aromatic or heterocyclic compound, X denotes a hydrogen atom or halogen atom, and m stands for an integer of 1–8.

The above azo pigments can each be obtained by diazotizing a diazo component having the group of the above general formula (I) in a manner known per se in the art and then subjecting the resultant diazonium salt and a conventionally-known coupling component or an azomethine-containing coupling component to a coupling reaction. The azomethine-containing azo pigments can also be obtained individually by diazotizing a conventionally-known diazo component and then subjecting the resultant diazonium salt and an azomethine-containing coupling component to a coupling reaction.

In the above azomethine-containing residuum (I), Ar is a residuum of an aromatic or heterocyclic compound and denotes a benzene ring, naphthalene ring, anthracene ring, pyridine ring or the like by way of example.

In the above description, the azomethine-containing diazo component may be, for example, 3-(4'-aminophenylimino)-1-oxo-4,5,6,7-tetrachloroisoindoline, 3-(3'-aminophenylimino)-1-oxo-4,5,6,7-tetrachloroisoindoline, 3-(2'-aminophenylimino)-1-oxo-4,5,6,7-tetrachloroisoindoline, 3-(4''-amino-diphenyl-4'-imino)-1-oxo-4,5,6,7-tetrachloroisoindoline or the like, an amino compound derived by substituting one or more substituents such as halogen atoms or methyl, methoxy, ethoxy or nitro groups to the phenylene or diphenylene group thereof, or the like.

The diazotization of the above diazo component can be effected by using a conventional aromatic amine diazotization method as is. It may be performed, for example, in accordance with a method in which diazotization is effected using a chilled solution of a mineral acid salt of the diazo component along with a solution of sodium nitrite, or by a method disclosed in Japanese Patent Publication Nos. 18383/1970 published on June 24, 1970, 37189/1971 published on Nov. 1, 1971 or 2102/1981 published on Jan. 17, 1981 or Japanese Patent Laid-Open No. 120923/1974 laid open to the public on Nov. 19, 1974.

Illustrative examples of the conventionally-known coupling component employed above for coupling with the azomethine-containing diazo component may include C.I. Azoic Coupling Components 1, 2, 10, 22, 17, 27, 18, 31, 8, 21, 29, 20, 34, 41, 6, 11, 24, 19, 12, 23, 14, 30, 46, 4, 7, 40, 3, 32, 36, 25, 13, 15, 16, 5, 35, 13 and 9; acetoacetic aryl amides such as acetoacetic anilide, acetoacetic 2-methylanilide, acetoacetic 4-methylanilide, acetoacetic 2,4-dimethylanilide, acetoacetic 2-methoxyanilide, acetoacetic 2-chloroanilide, acetoacetic 2-methoxy-5-methyl-4-chloroanilide, acetoacetic 2,5-dimethoxy-4-chloroanilide and acetoacetic 4-chloro-2-nitroanilide; 3-methyl-1-phenyl-5-pyrazolone; ethyl 1-phenyl-5-pyrazolone-3-carboxylate; hydroxynaphthoic acid; phenol; etc.

Illustrative examples of the above-described azomethine-containing coupling component may include those obtained by subjecting, to a condensation reaction, carboxylic acid couplers such as 2-hydroxy-3-naphthoic acid, 2-hydroxy-anthracene-3-carboxylic acid, 3-hydroxybenzofuran-2-carboxylic acid, 2-hydroxycarbazole-3-carboxylic acid, 2-hydroxy-α-benzocarbazole-3-carboxylic acid, 1-phenyl-5-pyrazolone-3-carboxylic acid, acetoacetic acid and the like and azomethine-containing amino compounds mentioned above as the azomethine-containing diazo components.

As illustrative examples of the conventionally-known diazo component used above for coupling with the azomethine-containing coupling component, may be mentioned C.I. Azoic Diazo Components 44, 2, 3, 6, 7, 37, 9, 16, 49, 17, 18, 19, 26, 33, 46, 11, 32, 34, 12, 8, 10, 5, 13, 1, 29, 31, 42, 14, 24, 43, 41, 40, 20, 15, 38, 51, 21, 23, 4, 27, 39, 48, 22, 47, 35, 45 and 36; aniline; toluidine; anisidine; naphthylamine, etc.

The diazotization, coupling reactions, purification, and conversion into pigments (in the case of pigments) of the above-described components can be effected respectively by methods known per se in the art. They are each conducted in a suitable medium of an aqueous or organic solvent.

Particularly-preferable azomethine-containing azo coloring agents are, for example, the azo coloring agents disclosed in Japanese Patent Laid-Open Nos. 174446/1983 laid open to the public on Oct. 13, 1983 and 149666/1985 laid open to the public on Aug. 7, 1985, and Japanese Patent Publication Nos. 2102/1981 published on Jan. 17, 1981, 45100/1980 published on Nov. 15, 1980, 27137/1982 published on June 9, 1982 and 27138/1982 published on June 9, 1982 as well as those employed in Japanese Patent Laid-Open Nos. 30202/1987 laid open to the public on Feb. 9, 1987 and 138857/1987 laid open to the public on June 22, 1987.

In particular, azomethine-containing azo pigments making use of a 2-hydroxy-α-benzocarbazole-3-carboxylic aryl amide and its derivatives showed color tones of from a dark green color to a black color under visible light. Especially, those having black colors exhibited vivid black colors having high degrees of blackness. They however showed substantially no or lower absorption for infrared rays but exhibited high reflectivities.

Although the azomethine-containing azo pigments mentioned above are excellent black coloring agents or deep-hue coloring agents, they have excellent infrared reflectivity, superb heat resistance, light resistance, waterproofness and chemical resistance and high tinting power.

Further, the coloring agents of the pigment type additionally showed properties excellent in solvent resistance.

Conventionally-known pigments and dyes having such properties are used as infrared absorptive coloring agents in the present invention. Particularly preferred are, for example, carbon black pigments, aniline black pigments, iron oxide black pigments, titanium oxide black pigments, spinel-structured black pigments and the like. These infrared absorptive coloring agents may each be used in combination with one or more of other coloring agents such as dyes and pigments known conventionally, for example, the above-described infrared reflective pigments, titanium oxide pigment, iron oxide pigment, calcined pigments, metal powder pigments and extender pigments, as needed.

The term "infrared reflective" as used herein means practical properties in prints and includes not only a situation where reflection takes place owing to the properties of a coloring agent per se employed in printing but also another situation where a coloring agent itself has infrared transmitting property rather than infrared reflective property but owing to the infrared reflectivity of a material printed (which may also be referred to as "base material" herein) such as paper or a film coated or printed as a primer, the print shows infrared reflectivity as a result.

As examplary base materials useful in the practice of this invention, may be mentioned conventionally-known materials which can be printed or coated, such as paper, chemical fiber mixed paper, synthetic paper, plastic films, plastic sheets, synthetic leather, molded plastic articles, metal products, wood and plywood. Among these, various paper sheets such as uncoated printing paper, art paper, coated paper, light-weight coated paper, offset rotary press printing paper, mat coated paper and groundwood paper can be used suitably depending on each application field.

Printing inks containing the above-described coloring agents may be printing inks which have been known to date and are suitable for the base materials mentioned above. It is possible to use, for example, letterpress inks, lithographic inks, intaglio gravure inks, screen process inks and the like. Classifying them in accordance with the types of media, oil-based inks, solvent-based inks and water-based inks can be used.

As coating formulations containing the coloring agents mentioned above, it is possible to use coating formulations which have been known and are suitable for such base materials as mentioned above. Among water-bases systems, aqueous solutions, aqueous emulsions and aqueous dispersions as well as their mixtures may be used. Of oil-based systems, oily solutions, oily emulsions and oily dispersions as well as mixtures thereof may be employed.

Exemplary resin components useful in such printing inks and coating formulations may be those known conventionally. Illustrative examples of the resin for water-based printing inks and aqueous coating formulations may include casein, hydroxyethylcellulose, water-soluble salts of styrene-maleic ester copolymers, water-soluble salts of (meth)acrylic ester (co)polymers, water-soluble salts of styrene-(meth)acrylic ester copolymers, water-soluble alkyd resins, styrenebutadiene copolymer latexes, (meth)acrylic ester copolymer latexes, styrene-(meth)acrylic ester copolymer latexes, ethylene-vinyl acetate copolymer latexes, polyethylene dispersions, ethylene copolymer dispersions, etc.

As exemplary resin components for oil-based printing inks and oil-based coating formulations, may be mentioned cellulose acetate butyrate, nitrocellulose, vinyl acetate (co)polymers, styrene (co)polymers, vinyl chloride-vinyl acetate copolymers, ethylene-vinyl acetate copolymers, polyvinyl butyral, alkyd resins, phenol-modified alkyd resins, styrenated alkyd resins, aminoalkyd resins, polyester polymers, polyurethane polymers, acrylic polyol urethane polymers, soluble polyamide polymers, phenol resins, rosin-modified phenol resins, rosin-modified maleic resins, and so on.

Further, examplary printing methods may include letterpress printing, lithographic printing, intaglio printing, gravure printing, screen printing and the like.

The coating method for each coating formulation may be chosen from methods known to date, in light of the properties and type of the coating formulation. Illustrative examples of the coating method may include blade coating, rod coating, knife coating, squeeze coating, air doctor coating, gravure coating, spray coating, roll coating, brushing, etc. Base materials may also be coated, drawn or written with a brush, felt-tip pen, fiber-tip pen, ball-point pen, crayon, pastel, pencil, colors, etc.

The existence or absence of infrared reflectivity or absorbance of a print and its degree are determined by an infrared reader, infrared picture or the like. As an infrared ray source for an infrared reader, may be used preferably a semiconductor laser or infrared ray emitting diode which gives off near infrared rays of 700–900 nm or infrared rays of about 790 nm. These infrared rays are irradiated as they are or in a form modulated to permit their high-sensitivity detection by an infrared detector. Infrared rays reflected by a print are detected by the infrared detector so that the existence or absence of their reflection and the intensity of the reflection are obtained as electrical signals. These electrical signals are then fed to various recognition systems, whereby they are recognized as useful information. For example, they are recognized as lighting of a warning lamp, generation of a warning sound, production of a synthesized voice, playing of a melody, display on a cathode ray tube, recording by a recorder or printer, indication or movement through an actuation of a motor, or the like, or a combination thereof.

By using the infrared detecting function of the infrared reader and the usual visual recognition of colors, it is possible to incorporate visually-unnoticeable information in prints. The infrared reader may be designed to output signals, for example, at three levels, i.e., (A) where reflection of infrared rays does not exist or is very little, (B) where reflection is medium, and (C) where reflection is very strong.

In the case of a print making use of an infrared absorptive carbon black pigment, the above-described level (A) corresponds to a dark gray-black color having a value of 6 or smaller in the Munsell color system, the level (B) to a bright gray color having a value of 7-8 and the level (C) to a dull white-white color having a value of 9 or greater. In the case of offset printing, such a print has a screen ruling of 50 lines and in terms of screen tint density, the above level (A) corresponds to a dark gray-black color of at least 50%, preferably, at least 70%, the level (B) to a bright gray of 40%-10% and the level (C) to a white color of 0%.

On the other hand, in the case of a print whose entire surface is coated with a printing ink containing an infrared reflective single or mixed black pigment, good infrared reflectivity is exhibited over an entire value range of 1.0-9.5. The above print therefore corresponds to the above level (C). In the case of offset printing, prints whose densities range from 0% to 100% in terms of screen tint density all show infrared reflectivity and hence correspond to the above level (C).

Upon printing letters, patterns, symbols or the like on a base material by making use of the difference in function to infrared rays between the two types of coloring agents, as mentioned above, the letters, patterns, symbols or the like can be formed by printing some areas of the base material with the printing ink containing the infrared absorptive coloring agent and some other areas of the same base material with the printing ink containing the infrared reflective coloring agent. The letters, patterns, symbols or the like printed in the former areas and those printed in the latter areas cannot be distinguished visually from each other. They can however be readily distinguished and recognized by an infrared reader.

A print, which cannot be distinguished visually but can be readily distinguished and recognized by an infrared reader, can be provide by printing continuous letters, patterns, symbols or the like with a printing ink containing an infrared absorptive coloring agent and another printing ink containing an infrared reflective coloring agent in combination.

A print, which cannot be distinguished visually but can be recognized by an infrared reader, can also be provided by applying as a primer a printing ink containing an infrared reflective coloring agent and then printing letters, patterns, symbols or the like on the primer with another printing ink containing an infrared absorptive coloring agent of the same color.

When a chromatic print is desired, signals from an infrared reader can be controlled to the above level (A), (B) or (C) by forming patterns with a chromatic infrared-absorptive ink and chromatic infrared-reflective ink, whose three attributes of hue, value and chroma in the Munsell color system have been adjusted to be substantially the same so that both inks look in substantially the same color, and making effective use of the infrared absorptivity and infrared reflectivity of these patterns.

On the other hand, infrared signals opposite to those expected from their corresponding colors under visible light may also be produced by changing one or all of the hue, value and chroma of both inks so as to make the inks have different colors under visible light, printing a base material with the inks and controlling signals from an infrared reader at the same level.

The above prints may be printed in three colors with inks of different colors. As an alternative, they may also be obtained by coating or printing inks whose colors have been matched in advance.

The present invention will next be described specifically by the following Examples, in which part, parts and % are all by weight.

EXAMPLE 1

Diazotized was 3-(4'-aminophenylimino)-1-oxo-4,5,6,7-tetrachloroisoindoline, followed by coupling with 2-hydroxy-α-benzocarbazole-3-carbo-(2'-methyl-4'-methoxy)anilide to obtain an azomethine-containing azo pigment. The azo pigment showed a black color and a decomposition point of 360° C. (Black Pigment R-1).

A black ink for offset lithography (Black Ink R-1) was prepared in accordance with the following formulation:

|  | Parts |
| --- | --- |
| Black Pigment R-1 obtained above | 30.0 |
| Formulated varnish for offset lithographic inks | 61.7 |
| Drier | 0.8 |
| Ink solvent | 7.5 |
| TOTAL | 100.0 |

In the above formulation, the formulated varnish for offset lithographic inks was formed principally of a rosin-modified phenol resin, a drying oil modified isophthalic alkyd and a drying oil and was also added with an ink solvent and an aluminum chelate.

Another black ink for offset lithography (Black Ink A-1) was prepared in accordance with the following formulation:

|  | Parts |
| --- | --- |
| Furnace type carbon black pigment (will be called "Black Pigment A-1") | 23.0 |
| Formulated varnish for offset lithographic inks | 71.2 |
| Drier | 0.8 |
| Ink solvent | 5.0 |
| TOTAL | 100.0 |

Separately using Black Ink R-1 and Black Ink A-1 obtained above, art paper sheets were printed solid at a screen ruling of 150 lines and a screen tint density of 100% to obtain printed black paper sheets.

In order to investigate properties of each of the above prints for visible light and infrared rays, their reflectivities were separately measured in an ultraviolet—visible—near infrared range by means of a self-recording spectrophotometer "Model 330" (trade name; manufactured by Hitachi Ltd.). Reflectivities at various wavelengths are given in the following table.

| Reflectivity (%) | | | Reflectivity (%) | | |
|---|---|---|---|---|---|
| Wavelength | R-1 | A-1 | Wavelength | R-1 | A-1 |
| 300 | 6 | 2 | 800 | 93 | 1 |
| 400 | 7 | 1 | 900 | 94 | 1 |
| 500 | 6 | 1 | 1000 | 95 | 1 |
| 600 | 5 | 1 | 1100 | 95 | 1 |
| 700 | 15 | 1 | 1200 | 93 | 1 |

In the above table, each wavelength is expressed in nanometers, R-1 indicates the prints printed with Black Ink R-1, and A-1 designates the prints printed with Black Ink A-1. The reflectivity of each print was measured by bringing a white alumina plate into a contiguous relation with the back side of the print.

The print making use of Black Ink R-1 did not show any substantial reflection in both ultraviolet and visible ranges. Although it presented a black color obviously, it showed a very high degree of reflection in the near infrared range.

On the other hand, the print printed with Black Ink A-1 showed no reflection in both visible and near infrared ranges.

It has been found from the foregoing that the prints of Black Ink R-1 and Black Ink A-1 both presented black colors when looked at visually but when exposed to near infrared rays, the print of the Black Ink R-1 showed substantially the same reflection of infrared rays as white background while the print of Black Ink A-1 absorbed infrared rays and did not show any reflection. These differences in properties between both prints have brought about a significant function.

EXAMPLE 2

A black letterpress ink (Black Ink R-2) was prepared using Black Pigment R-1 employed in Example 1. In addition, another black letterpress ink (Black Ink A-2) was also prepared using the furnace-type carbon black pigment employed in Black Ink A-1.

In order to print negotiable securities such as share certificates and bonds, letters, symbols and patterns were printed by using the above-described Black Ink R-2 and Black Ink A-2 in combination. Those letters, symbols and patterns looked in a black color to the naked eye, thereby failing to distinguish them from each other.

When the securities were exposed to infrared rays by means of an infrared reader, signals indicative of strong reflection of infrared rays were obtained from the areas printed with Black Ink R-2.

In contrast, the areas printed with Black Ink A-2 produced signals indicative of either no or very little reflection of infrared rays.

The above method permits easy discovery of forged negotiable securities such as share certificates and other certificates, since the distinction between genuine negotiable securities and the forged ones by means of an infrared reader is feasible owing to signal changes which take place in accordance with the existence or absence of reflection and the intensity of the reflection upon exposure to infrared rays.

In the above infrared reader, infrared rays are emitted from an infrared emitting diode (for example, "TLN 105", trade name, manufactured by Toshiba Corporation). They are modulated to increase their detection. Infrared rays which have been reflected by a print are detected by an infrared detector (for example, "TPS 703", trade name, manufactured by Toshiba Corporation), whereby the existence or absence of reflection and the intensity of the reflection can be recognized by the lighting of a warning lamp and a voice from a small speaker respectively.

EXAMPLE 3

Using Black Ink R-1 obtained in Example 1, a sheet of art paper was printed solid at a screen ruling of 150 lines and a screen tint density of 100% by means of an offset printing machine so that a printed black paper sheet was obtained. Black Ink A-1 obtained in Example 1 was additionally printed over Black Ink R-1 in the same manner.

The reflectivity of the double-printed print was measured by a self-recording spectrophotometer in the same manner as in Example 1.

| Reflectivity (%) | | Reflectivity (%) | |
|---|---|---|---|
| Wavelength Top print: A-1 | | Wavelength Top print: A-1 | |
| (nm) | Under print: R-1 | (nm) | Under print: R-1 |
| 300 | 1 | 800 | 1 |
| 400 | 1 | 900 | 1 |
| 500 | 1 | 1000 | 1 |
| 600 | 1 | 1100 | 1 |
| 700 | 1 | 1200 | 1 |

From the above results, it was found that the print obtained by using Black Ink R-1 for under printing and then printing Black Ink A-1 over the Black Ink R-1 did not show any substantial reflection and was absorbed in each of the ultraviolet, visible and near infrared ranges.

Needless to say, the print showed a black color accordingly and the infrared reader produced signals indicative of either no or extremely little reflection.

EXAMPLE 4

Printed first of all with Black Ink A-1 obtained in Example 1 are negotiable securities, bankbooks, credit cards, bank cards, lottery cards, pari-mutuel tickets, etc. at areas which should be kept under secrecy or at particular areas facilitating the recognition of forgery. Using Black Ink R-1 obtained in Example 1, their entire areas are covered or other areas are printed for the sake of confirmation, thereby to provide prints in each of which areas printed separately by the inks are not distinguishable or recognizable to the naked eye.

A print in which areas printed separately by Black Ink R-1 and Black Ink A-1 are neither distinguishable nor recognizable to the naked eye can also be obtained by printing Black Ink R-1 and Black Ink A-1 in an order opposite to the above order, namely, by printing Black Ink R-1 beforehand instead of Black Ink A-1 and then printing other areas with Black Ink A-1.

Since the areas printed separately by the inks can be recognized from each other depending on the differences of those inks in properties to infrared rays provided that an infrared reader such as that mentioned in Example 2 is used, the above printing method is effective for incorporating certain information which should desirably be kept secret to any third party or for discovering forged or altered items.

EXAMPLE 5

A process yellow ink, process magenta ink and process cyan ink were provided using C.I. Pigment Yellow 12, C.I. Red 57-1 and C.I. Pigment Blue 15 respectively. As black inks, were provided a process black ink (Black Ink A-3) using the carbon black pigment employed in Example 1, another process black ink (Black Ink R-3) using Black Pigment R-1 synthesized in Example 1, and a further process black ink (Black Ink AR-3) obtained by mixing 20 parts of Black Ink A-3 and 80 parts of Black Ink R-3 and then kneading them in a 3-roll mill. Hence, six process inks of different colors were provided in total.

In order to print a somewhat dull reddish purple color and somewhat dull yellowish green color by offset printing, printing plates were produced in the following manner. For the black inks, separate printing plates were provided for Black Ink A-3, Black Ink R-3 and Black Ink AR-3 respectively.

The screen ruling was set at 150 lines. Figures in the following table are screen tint densities expressed in terms of %.

| Printed color Printed Area | Reddish purple color | | |
|---|---|---|---|
| | Reddish purple A | Reddish purple B | Reddish purple C |
| Black plate for A-3 | 50 | 0 | 0 |
| Black plate for R-4 | 0 | 50 | 0 |
| Black plate for AR-4 | 0 | 0 | 50 |
| Cyan plate | 50 | 50 | 50 |
| Magenta plate | 90 | 90 | 90 |
| Yellow plate | 0 | 0 | 0 |

| Printed color Printed Area | Yellowish green color | | |
|---|---|---|---|
| | Yellowish green A | Yellowish green B | Yellowish green C |
| Black plate for A-3 | 50 | 0 | 0 |
| Black plate for R-4 | 0 | 50 | 0 |
| Black plate for AR-4 | 0 | 0 | 50 |
| Cyan plate | 80 | 80 | 80 |
| Magenta plate | 0 | 0 | 0 |
| Yellow plate | 80 | 80 | 80 |

Using the above offset printing inks of six different colors, printing was performed with the printing plates described above. In the resulting prints, the reddish purple A, reddish purple B and reddish purple C showed patterns of a substantially identical color and were hence undistinguishable to the naked eye. This also applied to the yellowish green A, yellowish green B and yellowish green C.

When the above prints were examined by the infrared reader mentioned in Example 2, signals indicative of either no or very little reflection of infrared rays were however produced from the areas printed with the reddish purple A or yellowish green A. From the areas printed with the reddish purple C or yellowish green C, signals indicative of a medium degree of reflection of infrared rays were obtained, while signals indicative of very strong reflection were produced from the areas printed with the reddish purple B or yellowish green B.

From those prints, information different from those recognized visually can be obtained as signals by using an infrared reader.

They may be used as teaching aids, picture books, toys, play and amusement equipment, and the like for students and infants.

They are also effective for the prevention and discovery of forgery or alteration of negotiable securities, important documents, secret documents and the like as described in Example 2 and for like purposes.

EXAMPLE 6

In the same manner as in Examples 1–5, various letters, symbols and patterns were printed using, instead of Black Inks R-1–R-3 and Black Ink AR-3, a black ink which had been obtained by using a black pigment formed by diazotizing 3-(4'-aminophenylimino)-1-oxo-4,5,6,7-tetrachloroisoindoline and then subjecting the resultant diazonium salt and 2-hydroxy-α-benzocarbazole-3-carbo-(4'methoxy)-anilide to a coupling reaction. As a result, a print was obtained which produced signals indicative of reflection of infrared rays upon its measurement by a self-recording spectrophotometer in the same manner as in Examples 1–5 and coupled with the combined use of Black Inks A-1–A-3 and the process inks of the three primary colors, exhibited a superb function to infrared rays.

EXAMPLE 7

Diazotized was 3-(4'-amino-3',6'-dimethoxyphenylimino)-1-oxo-4,5,6,7-tetrachloroisoindoline, followed by coupling with 2-hydroxy-3-naphthoic anilide to obtain a purple pigment.

On the side, 3-(4'-aminophenylimino)-1-oxo-4,5,6,7-tetrachloroisoindoline was diazotized and the resultant diazonium salt was then coupled with acetoacetic-(2'-chloro)anilide to obtain a yellow pigment.

The purple pigment and yellow pigment obtained above were mixed to prepare a black ink. Using the black ink in lieu of Black Inks R-1–R-3 and Black Ink AR-3 in Examples 1–5, a variety of letters, symbols and patterns were printed in the same manner as in Examples 1–5, thereby obtaining prints which produced signals indicative of reflection of infrared rays upon measurement by a self-recording spectrophotometer in the same manner as in Examples 1–5 and coupled with the combined use of Black Inks A-1–A-3 and the process inks of the three primary colors, exhibited a superb function to infrared rays.

EXAMPLE 8

A black ink for offset lithography (Black Ink R-4) was prepared in accordance with the following formulation:

| | Parts |
|---|---|
| C.I. Pigment Blue 25 (purple blue pigment) | 22.5 |
| C.I. Pigment Yellow 83 (yellow pigment) | 7.5 |
| Formulated varnish for offset lithographic inks | 61.7 |
| Drier | 0.8 |
| Ink solvent | 7.5 |
| TOTAL | 100.0 |

In the above formulation, the formulated varnish for offset lithographic inks was identical to that employed in Example 1.

On the side, the same black ink for offset lithography (Black Ink A-1) as that prepared in Example 1 was also provided.

Separately using Black Ink R-4 and Black Ink A-1 obtained above, art paper sheets were printed solid at a screen ruling of 150 lines and a screen tint density of 100% to obtain printed black paper sheets.

In order to investigate properties of each of the above prints for visible light and infrared rays, their reflectivities were separately measured in an ultraviolet—visible—near infrared range by means of the self-recording spectrophotometer "Model 330" (trade name, manufactured by Hitachi Ltd.). Reflectivities at various wavelengths are given in the following table.

| Reflectivity (%) | | | Reflectivity (%) | | |
|---|---|---|---|---|---|
| Wavelength | R-4 | A-1 | Wavelength | R-4 | A-1 |
| 300 | 4 | 2 | 800 | 91 | 1 |
| 400 | 3 | 1 | 900 | 94 | 1 |
| 500 | 3 | 1 | 1000 | 95 | 1 |
| 600 | 3 | 1 | 1100 | 95 | 1 |
| 700 | 4 | 1 | 1200 | 92 | 1 |

In the above table, R-4 indicates a print printed with Black Ink R-4 while A-1 designates another print printed with Black Ink A-1.

The print making use of Black Ink R-4 did not show any substantial reflection in both ultraviolet and visible ranges. Although it presented a black color obviously, it showed a very high degree of reflection in the near infrared range.

On the other hand, the print printed with Black Ink A-1 showed no reflection in any one of the ultraviolet, visible and near infrared ranges.

It has been found from the foregoing that the prints of Black Ink R-4 and Black Ink A-1 both presented black colors when looked at visually but when exposed to near infrared rays, the print of the Black Ink R-4 showed substantially the same reflection of infrared rays as white background while the print of Black Ink A-1 absorbed infrared rays and did not show any reflection. These differences in properties between both prints have brought about a significant function.

EXAMPLE 9

A black letterpress ink (Black Ink R-5) was prepared using the purple blue pigment and yellow pigment employed in Example 8. In addition, the black letterpress ink (Black Ink A-2) as that employed in Example 2 was also prepared.

In order to print negotiable securities such as share certificates and bonds, letters, symbols and patterns were printed by using the above-described Black Ink R-5 and Black Ink A-2 in combination. Those letters, symbols and patterns looked in a black color to the naked eye, thereby failing to distinguish them from each other.

When the securities were exposed to infrared rays by means of an infrared reader, signals indicative of strong reflection of infrared rays were obtained from the areas printed with Black Ink R-5.

In contrast, the areas printed with Black Ink A-2 produced signals indicative of either no or very little reflection of infrared rays.

The above method permits easy distinction between genuine negotiable securities, such as share certificates and other certificates, and forged negotiable securities by detecting the existence or absence of reflection or the degree of the reflection upon irradiation of infrared rays by means of the infrared reader mentioned in Example 2.

EXAMPLE 10

In the same manner as in Example 8, a black offset printing ink (Black Ink R-6) was prepared using 8.3 parts of C.I. Pigment Blue 15 (blue pigment), 15.0 parts of C.I. Pigment Red 5 (red pigment) and 6.7 parts of C.I. Pigment Yellow 17 (yellow pigment) instead of the purple blue pigment and the yellow pigment of Black Ink R-4.

Using Black Ink R-6 obtained above, a sheet of art paper was offset-printed in the same manner as in Examples 1 and 8. The reflectivity of the resultant print printed in a black color was measured by a self-recording spectrophotometer. The following results were obtained.

| Wavelength (nm) | Reflectivity (%) R-6 | Wavelength (nm) | Reflectivity (%) R-6 |
|---|---|---|---|
| 300 | 5 | 800 | 87 |
| 400 | 6 | 900 | 93 |
| 500 | 8 | 1000 | 93 |
| 600 | 7 | 1100 | 93 |
| 700 | 8 | 1200 | 90 |

In the above table, R-6 indicates the print printed with Black Ink R-6.

From the above results, it has been found that that the print obtained by using Black Ink R-6 did not show any substantial reflection and obviously showed a black color in both ultraviolet and visible ranges but exhibited a very high reflectivity in the near infrared range.

Using Black Ink R-6 obtained above, a sheet of art paper was printed solid at a screen ruling of 150 lines and a screen tint density of 100% by means of an offset printing machine so that a printed black paper sheet was obtained. Black Ink A-1 obtained in Example 1 was additionally printed over Black Ink R-6 in the same manner.

The reflectivity of the double-printed print was measured by a self-recording spectrophotometer in the same manner as in Example 1.

| Wavelength (nm) | Reflectivity (%) Top print: A-1 Under print: R-6 | Wavelength (nm) | Reflectivity (%) Top print A-1 Under print: R-6 |
|---|---|---|---|
| 300 | 1 | 800 | 1 |
| 400 | 1 | 900 | 1 |
| 500 | 1 | 1000 | 1 |
| 600 | 1 | 1100 | 1 |
| 700 | 1 | 1200 | 1 |

From the above results, it was found that the print obtained by using Black Ink R-6 for under printing and then printing Black Ink A-1 over the Black Ink R-6 did not show any substantial reflection and was absorbed in each of the ultraviolet, visible and near infrared ranges.

Needless to say, the print showed a black color accordingly and the infrared reader produced signals indicative of either no or extremely little reflection.

EXAMPLE 11

Printed first of all with Black Ink A-1 obtained in Example 1 are negotiable securities, bankbooks, credit cards, bank cards, lottery cards, pari-mutuel tickets, etc. at areas which should be kept under secrecy or at particular areas facilitating the recognition of forgery. Using Black Ink R-4 obtained in Example 8, their entire areas are covered or other areas are printed for the sake of confirmation, thereby to provide prints in each of which areas printed separately by the inks are not distinguishable or recognizable to the naked eye.

A print in which areas printed separately by Black Ink R-8 and Black Ink A-1 are neither distinguishable nor recognizable to the naked eye can also be obtained by printing Black Ink R-8 and Black Ink A-1 in an order opposite to the above order, namely, by printing Black Ink R-8 beforehand instead of Black Ink A-1 and then printing other areas with Black Ink A-1.

Since the areas printed separately by the inks can be recognized from each other depending on the differences of those inks in properties to infrared rays provided that an infrared reader such as that mentioned in Examples 2 and 9 is used, the above printing method is effective for incorporating certain information which should desirably be kept secret to any third party or for discovering forged or altered items.

EXAMPLE 12

A process yellow ink, process magenta ink and process cyan ink were provided using C.I. Pigment Yellow 12, C.I. Red 57-1 and C.I. Pigment Blue 15 respectively. As black inks, were provided a process black ink (Black Ink A-3) using the carbon black pigment employed in Example 1, another process black ink (Black Ink R-7) using in combination the purple blue pigment and yellow pigment employed in Example 8, and a further process black ink (Black Ink AR-7) obtained by mixing 20 parts of Black Ink A-3 and 80 parts of Black Ink R-7 and then kneading them in a 3-roll mill. Hence, six process inks of different colors were provided in total.

In order to print a somewhat dull reddish purple color and somewhat dull yellowish green color by offset printing, printing plates were produced in the following manner. For the black inks, separate printing plates were provided for Black Ink A-3, Black Ink R-7 and Black Ink AR-7 respectively.

The screen ruling was set at 150 lines. Figures in the following table are screen tint densities expressed in terms of %.

| Printed color<br>Printed Area | Reddish purple color | | |
|---|---|---|---|
| | Reddish purple D | Reddish purple E | Reddish purple F |
| Black plate for A-3 | 50 | 0 | 0 |
| Black plate for R-7 | 0 | 50 | 0 |
| Black plate for AR-7 | 0 | 0 | 50 |
| Cyan plate | 50 | 50 | 50 |
| Magenta plate | 90 | 90 | 90 |
| Yellow plate | 0 | 0 | 0 |

| Printed color<br>Printed area | Yellowish green color | | |
|---|---|---|---|
| | Yellowish green D | Yellowish green E | Yellowish green F |
| Black plate for A-3 | 50 | 0 | 0 |
| Black plate for R-7 | 0 | 50 | 0 |
| Black plate for AR-7 | 0 | 0 | 50 |
| Cyan plate | 80 | 80 | 80 |
| Magenta plate | 0 | 0 | 0 |
| Yellow plate | 80 | 80 | 80 |

Using the above offset printing inks of six different colors, printing was performed with the printing plates described above. In the resulting prints, the reddish purple D, reddish purple E and reddish purple F showed patterns of a substantially identical color and were hence undistinguishable to the naked eye. This also applied to the yellowish green D, yellowish green E and yellowish green F.

When the above prints were examined by the infrared reader mentioned in Examples 2 and 9, signals indicative of either no or very little reflection of infrared rays were however produced from the areas printed with the reddish purple D or yellowish green D. From the areas printed with the reddish purple F or yellowish green F, signals indicative of a medium degree of reflection of infrared rays were obtained, while signals indicative of very strong reflection were produced from the areas printed with the reddish purple E or yellowish green E.

From those prints, information different from those recognized visually can be obtained as signals by using an infrared reader.

They may be used as teaching aids, picture books, toys, play and amusement equipment, and the like for students and infants.

They are also effective for the prevention and discovery of forgery or alteration of negotiable securities, important documents, secret documents and the like as described in Examples 2 and 9 and for like purposes.

EXAMPLE 13

In the same manner as in Examples 8–12, various letters, symbols and patterns were printed using, instead of Black Inks R-4–R-7 and Black Ink AR-7, a black ink which had been obtained by using a black pigment formed by diazotizing 2-methoxy-5-chloroaniline and then subjecting the resultant diazonium salt and 2-hydroxy-α-benzo-carbazole-3-carbo-(4'-methoxy)-anilide to a coupling reaction. As a result, a print was obtained which produced signals indicative of reflection of infrared rays upon its measurement by a self-recording spectrophotometer in the same manner as in Examples 8–12 and coupled with the combined use of Black Inks A-1–A-3 and the process inks of the three primary colors, exhibited a superb function to infrared rays.

EXAMPLES 14–30

C.I. Azoic Diazo Components in the following table were separately diazotized, followed by a coupling reaction with their corresponding C.I. Azoic Coupling Components to obtain various black pigments.

These black pigments were separately formulated into black inks in the same manner as the black pigment obtained in Example 13. In the same manner as in Examples 8–12, various letters, symbols and patterns were printed using, instead of Black Inks R-4–R-7 and Black Ink AR-7, the above-formulated black inks separately. As a result, prints were obtained each of which produced signals indicative of reflection of infrared rays upon its measurement by a self-recording spectrophotometer and signals indicative of reflection of infrared rays upon its measurement by an infrared reader, both, in the same manner as in Examples 8–12 and coupled with the combined use of Black Inks A-1–A-3 and the process inks of the three primary colors, exhibited a superb function to infrared rays.

EXAMPLE 14

C.I. Azoic Diazo Component 48
C.I. Azoic Coupling Component 13
Color of the resultant pigment: black

EXAMPLE 15

C.I. Azoic Diazo Component 38
C.I. Azoic Coupling Component 20
Color of the resultant pigment: somewhat bluish black

EXAMPLE 16

C.I. Azoic Diazo Component 38
C.I. Azoic Coupling Component 2
Color of the resultant pigment: somewhat bluish black

EXAMPLE 17

C.I. Azoic Diazo Component 38
C.I. Azoic Coupling Component 10
Color of the resultant pigment: somewhat bluish black

EXAMPLE 18

C.I. Azoic Diazo Component 38
C.I. Azoic Coupling Component 18
Color of the resultant pigment: somewhat bluish black

EXAMPLE 19

C.I. Azoic Diazo Component 38
C.I. Azoic Coupling Component 17
Color of the resultant pigment: somewhat bluish black

EXAMPLE 20

C.I. Azoic Diazo Component 38
C.I. Azoic Coupling Component 7
Color of the resultant pigment: somewhat bluish black

EXAMPLE 21

C.I. Azoic Diazo Component 38
C.I. Azoic Coupling Component 4
Color of the resultant pigment: somewhat bluish black

EXAMPLE 22

C.I. Azoic Diazo Component 38
C.I. Azoic Coupling Component 3
Color of the resultant pigment: somewhat reddish black

EXAMPLE 23

C.I. Azoic Diazo Component 36
C.I. Azoic Coupling Component 25
Color of the resultant pigment: black

EXAMPLE 24

C.I. Azoic Diazo Component 38
C.I. Azoic Coupling Component 13
Color of the resultant pigment: somewhat greenish black

EXAMPLE 25

C.I. Azoic Diazo Component 32
C.I. Azoic Coupling Component 25
Color of the resultant pigment: black

EXAMPLE 26

C.I. Azoic Diazo Component 35
C.I. Azoic Coupling Component 25
Color of the resultant pigment: black

EXAMPLE 27

C.I. Azoic Diazo Component 41
C.I. Azoic Coupling Component 25
Color of the resultant pigment: black

EXAMPLE 28

C.I. Azoic Diazo Component 42
C.I. Azoic Coupling Component 25
Color of the resultant pigment: black

EXAMPLE 29

C.I. Azoic Diazo Component 43
C.I. Azoic Coupling Component 13
Color of the resultant pigment: somewhat greenish black

EXAMPLE 30

C.I. Azoic Diazo Component 47
C.I. Azoic Coupling Component 13
Color of the resultant pigment: somewhat greenish black

We claim:

1. A print comprising a base material and a printing ink containing an infrared reflective black azo pigment and another printing ink containing an infrared absorptive black pigment applied in combination on the base material, whereby visually-recognizable information is provided along with other information, which is recognizable by infrared rays, on the base material.

2. The print as claimed in claim 1, wherein the infrared reflective black azo pigment is a black pigment having an azo group or a black pigment having an azo group and an azomethine group represented by the following general formula:

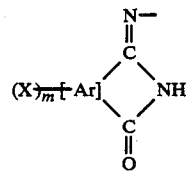

wherein Ar is a hydrocarbyl aromatic or heterocyclic aromatic radical, X denotes a hydrogen atom or halogen atom, and m stands for an integer of 1–8.

3. The print as claimed in claim 1, wherein the infrared absorptive black pigment is at least one black pigments selected from the group consisting of carbon black pigments, aniline black pigments, iron oxide black pigments, titanium oxide black pigments and spinel-structured black pigments.

4. A method for the production of a print, which comprises applying a printing ink containing an infrared reflective black azo pigment and another printing ink containing an infrared absorptive black pigment in combination on a base material, whereby visually recognizable information is provided along with other information, which is recognizable by infrared rays, on the base material.

5. The method as claimed in claim 4, wherein the infrared reflective black azo pigment is a black pigment having an azo group or a black pigment having an azo group and an azomethine group represented by the following formula:

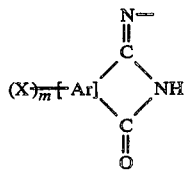

wherein Ar is a a hydrocarbyl aromatic or heterocyclic aromatic radical, X denotes a hydrogen atom or halogen atom, and m stands for an integer of 1-8.

6. The method as claimed in claim 4, wherein the infrared absorptive black pigment is at least one black pigment selected from the group consisting of carbon black pigments, aniline black pigments, iron oxide black pigments, titanium oxide black pigments and spinel-structured black pigments.

* * * * *